United States Patent [19]

Kashi et al.

[11] Patent Number: 5,828,772
[45] Date of Patent: Oct. 27, 1998

[54] METHOD AND APPARATUS FOR PARAMETRIC SIGNATURE VERIFICATION USING GLOBAL FEATURES AND STROKE-DIRECTION CODES

[75] Inventors: Ramanujan S. Kashi, Highland Park; Winston Lowell Nelson, Morristown; William Turin, East Brunswick, all of N.J.

[73] Assignee: Lucent Technologies Inc., Murray Hill, N.J.

[21] Appl. No.: 579,534

[22] Filed: Dec. 27, 1995

[51] Int. Cl.$^6$ ........................................................ G06K 9/00
[52] U.S. Cl. .................................................................. 382/119
[58] Field of Search ...................................... 382/119, 120, 382/122, 123, 186, 197

[56] References Cited

U.S. PATENT DOCUMENTS

| | | | |
|---|---|---|---|
| 3,699,517 | 10/1972 | Dyche | 340/146.3 |
| 4,024,500 | 5/1977 | Herbst | 340/146.3 |
| 4,040,010 | 8/1977 | Crane | 340/146.3 |
| 4,286,255 | 8/1981 | Siy | 382/123 |
| 4,495,644 | 1/1985 | Parks | 382/3 |
| 4,901,358 | 2/1990 | Bechet | 382/3 |
| 5,040,222 | 8/1991 | Muroya | 382/123 |
| 5,042,073 | 8/1991 | Collot | 382/3 |
| 5,109,426 | 4/1992 | Parks | 382/3 |
| 5,111,512 | 5/1992 | Fan | 382/3 |
| 5,113,041 | 5/1992 | Blonder | 178/18 |
| 5,434,928 | 7/1995 | Wagner et al. | 382/119 |
| 5,559,895 | 9/1996 | Lee et al. | 382/119 |

FOREIGN PATENT DOCUMENTS

| | | |
|---|---|---|
| 2649509 | 1/1991 | France . |
| 615 032 | 12/1979 | Switzerland . |

OTHER PUBLICATIONS

M. Achemlal, "Dynamic Signature Verification," Security and Protection in Information Systems, A. Grissonanche, ed., Elsevier (1989), Proc. 4th IFIP TC 11 International Conference on Computer Security, Monte Carlo, pp. 381–389.

H. Sakoe, "Dynamic Programming Algorithm Optimization for Spoken Word Recognition," IEEE Trans. Acoust., Speech, Sigal Processing, vol. ASSP–26 (1978) pp. 43–49.

H. F. Silverman and D. P. Morgan, "The Application of Dynamic Programming to Connected Speech Recognition," IEEE ASSP Magazine, Jul. 1990, pp. 7–25.

W. Nelson, W. Turin, and T. Hastie, "Statistical Methods for On–Line Signature Verification," International Journal of Pattern Recognition and Artificial Intelligence, vol. 8, No. 3 (1994), pp. 749–770.

F. Leclerc and R. Plamondon, "Automatic Signature Verification: The State of the Art 1989–1993," International Journal of Pattern Recognition and Artificial Intelligence, vol. 8, No. 3 (1994), pp. 643–660.

R. Plamondon, "The Design of An On–Line Signature Verification System: From Theory to Practice," International Journal of Pattern Recognition and Artificial Intelligence, vol. 8, No. 3 (1994), pp. 795–811.

Primary Examiner—David K. Moore
Assistant Examiner—Brian P. Werner
Attorney, Agent, or Firm—Martin I. Finston

[57] ABSTRACT

A signature verification method operates by comparing the numerical values of parameters evaluated on a trial signature with stored reference data derived from previously entered reference signatures. The parameters include global features of the signature, and also include a stroke-direction code (SDC) of the signature. An SDC is derived by subdividing the signature into a sequence of time-ordered, spatially oriented line segments, each segment extending between a pair of discrete points along the signature. Each line segment has a stroke-direction value. The SDC is the ordered sequence of these stroke-direction values.

11 Claims, 6 Drawing Sheets

SDC: 09-14-02-...-01

METHOD AND APPARATUS FOR PARAMETRIC SIGNATURE VERIFICATION USING GLOBAL FEATURES AND STROKE-DIRECTION CODES

TECHNICAL FIELD

This invention relates to the automatic verification of handwritten human signatures.

ART BACKGROUND

The automatic verification of a signature is a useful way to identify a human being for purposes, e.g., of establishing his authority to complete an automated transaction, or gain control of a computer, or gain physical entry to a protected area. Signatures are particularly useful for identification because each person's signature is highly unique, especially if the dynamic properties of the signature are considered in addition to the shape of the signature. Even if skilled forgers can accurately reproduce the shape of signatures, it is unlikely that they can reproduce the dynamic properties as well.

Numerous practitioners have addressed the problem of signature verification. Some of them have concentrated on analysis of the static shapes embodied in signatures, whereas others have concentrated on analysis of dynamic properties. For example, a verification method that involves analyzing the dynamic properties of signatures is described in U.S. Pat. No. 4,901,358, issued to L. Bechet on Feb. 13, 1990. That patent discloses a verification method based on signals that represent the speed of the stylus, moving in the x (i.e., horizontal) and y (i.e., vertical) spatial directions in the plane of the tablet that receives the signature. Each speed signal is broken into standardized, short segments, and each segment is compared with a corresponding segment of a previously obtained reference signature. In a contrasting approach, U.S. Pat. No. 4,024,500, issued to N. M. Herbst, et al. on May 17, 1977, discloses the use of the speed signal to separate the signature into segments, followed by shape analysis of the segments. A third approach is described in U.S. Pat. No. 5,111,512, issued to J. C. Fan, et al. on May 5, 1992. In that approach, a model signature is used as a reference for shape analysis. The model signature is constructed by affine invariant averaging of reference signature segments. (Affine invariant averaging treats signature segments as equivalent if they differ only by, e.g., scale, rotation, or translation.) In a speed-based segmentation method, each signature to be segmented is compared to a selected reference signature through the use of dynamic time warping. (Dynamic time warping is a scheme by which one signal is non-linearly stretched or compressed in time to best match another signal.) However, when a person's (hereafter, an "entrant's") signature is verified according to one of the above-described methods, it is compared, segment-by-segment, to a reference signature. As a consequence, such methods require a relatively large amount of information about the reference signature to be stored. This requirement is disadvantageous in applications where only limited storage is available. For such applications, it is desirable to characterize the entrant's signature by a set of numerical parameters which, although relatively small, still identify that person's signature with a high degree of confidence.

Moreover, such a parameter-based technique, even if it fails to provide an acceptable confidence level, is useful in combination with more complex techniques (based, e.g., on pattern-matching) which offer greater confidence at the cost of greater delay and/or greater information storage requirements. In such a combination, the parameter-based technique is useful as a coarse sieve for rejecting gross forgeries or anomalous signatures, without the need to invoke the more complex technique.

Several signature verification techniques based on numerical parameters have, in fact, been described. U.S. Pat. No. 3,699,517, issued to James W. Dyche on Oct. 17, 1972, describes a technique in which sixteen components of a real-time signature vector are compared to the corresponding mean values computed on a reference set of previously obtained sample signatures. If a sufficient number of the components fall within a predetermined range of the respective mean values, the signature is accepted.

Another parametric technique is described in M. Achemlal, et al., "Dynamic Signature Verification," in *Security and Protection in Information Systems*, A. Grissonnanche, ed., Elsevier (1989), pp. 381–389, and in M. Achemlal, et al., France Pat. Application Publication No. 2,649,509 (Jan. 11, 1991). This technique includes choosing a subset from 40 possible parameters. This selection is made in such a way as to optimize the discrimination between a set of known true signatures and a set of known forgeries.

Many of the parameters used in the prior art for verifying signatures are global, in the sense that they are based on a property of the signature as a whole, or of a substantial part of the signature, rather than a property of the signature that depends on an individual shape or detail within the signature. For example, a dynamic property such as the speed or acceleration of the stylus (or one or more vector components thereof) can be evaluated from the output of a digitizing tablet or instrumental stylus, and averaged over the entire signature. Other global parameters (or global features as they are referred to herein) may include the total duration and total spatial length of the signature.

During a typical registration procedure, a person enters two or more reference signatures. Two or more global features are evaluated on each reference signature, and for each feature, an average overall reference signature is computed. Thus, the set of reference signatures is encoded as a group of average feature values.

When a trial signature is submitted for verification, it is encoded in the same manner, and the trial-signature feature values are compared to the average (reference) feature values. If the resemblance is close, the signature is deemed genuine. If not, it is rejected as a forgery.

Because global features do not relate directly to the shape of the components of a signature, a signature code based solely on global features will be, by nature, an incomplete record of the signature. This fact, together with natural inconsistencies between the same individual's signatures, leads to acceptances of forged signatures and rejections of genuine signatures by the verification process.

SUMMARY OF THE INVENTION

We have found an efficient and economical way to add information to the signature code that complements the global features. As a result, fewer forgeries are accepted, and fewer genuine signatures are rejected.

The information that we add is referred to as a stroke-direction code (SDC). The SDC of a signature is obtained by subdividing the signature into a sequence of line segments, which we refer to as links, between discrete points along the signature. These links are ordered according to the time-sequence in which the corresponding portions of the signature were made. To each link we assign a stroke-direction value that depends upon the orientation of that link. These values are not continuous, but instead vary in discrete increments which might, for example, correspond to angular increments of 22.5° (due to a division of the circle into sixteen equal sectors).

The SDC of a signature is the resulting sequence of stroke-direction values.

As noted, verifying a trial signature involves comparing its feature values to the reference feature values. This comparison is conveniently carried out by computing a total global feature error. This error is obtained by combining (in an appropriate norm) the individual discrepancies between each trial-signature feature value and the corresponding reference value. The total error is compared to a threshold, which is usefully established with reference to deviation measures, such as the standard deviations, of the global features over the group of reference signatures. That is, a larger total error should be tolerated if the global features exhibit a high degree of scatter, than if they show a low degree of scatter.

For verification purposes, an SDC error (which can be combined with the total global feature error) is readily computed by comparing the SDC of a trial signature with an average or representative SDC derived from the reference signatures. We refer to this average or representative SDC as the SDC template.

DETAILED DESCRIPTION

An entrant provides a set of his or her own signatures sampled in real time by a device which digitizes the signatures and transmits the resulting data to a digital memory in which each signature is stored as a time-ordered array. Each of these signatures is referred to herein as a "reference signature," and the set of these signatures is referred to as the "reference set."

An exemplary digitizing device comprises a capacitance-sensing, transductive tablet which senses the position (i.e., the horizontal, or x coordinate and the vertical, or y coordinate) of the tip of a stylus, and transmits that information to a digital storage device (e.g., a digital computer). Such a device is advantageously also capable of sensing, and transmitting data representing, the stylus pressure (exemplarily by means of a pressure transducer in the stylus) in order to detect when the stylus is raised ("pen-up") and when it is lowered ("pen-down"). Alternatively, pen-up and pen-down transitions can be inferred from spatiotemporal information, for example from the occurrence of a significant jump in both xy-space and time. One suitable stylus-tablet inputting apparatus is described in U.S. Pat. No. 5,113,041, issued to G. E. Blonder, et al., May 12, 1992.

The size of the reference set is desirably at least 5 signatures, and in some cases as many as 10 or more. Each signature is recorded as a sequence of x-y coordinate pairs recorded at a uniform sampling rate. The time coordinate, t, is also advantageously recorded for each sampled point. This makes it possible to compute the stylus velocity accurately.

Although the recorded data are typically smooth, there are occasional gross outliers and noisy points which need to be removed (typically, less than 1% of the total). These are easily identified by their large Euclidean distance from the neighboring points, or large velocity.

A smooth path is then desirably constructed through the remaining x and y coordinates for each word in each signature. This is preferably done by smoothing each coordinate separately against time using a cubic smoothing spline.

We now describe an exemplary smoothing procedure that we are currently using.

The amount of smoothing is chosen automatically by global cross-validation of the integrated Euclidean distance between the observed and fitted points. Typically very little smoothing is performed, and the fitted curves usually come close to interpolating the observed sequences. There are three reasons for smoothing the signature sequences in this way: (1) even though the amount of smoothing is small, it tends to eliminate small discontinuities introduced by measurement error due to the discretization during the recording process (quantization noise), or small movements during the signing; (2) the cubic spline representation turns the sequence into a function that can be evaluated at any point t (this is convenient for purposes of subsequent steps); and (3) the cubic spline has two continuous derivatives with respect to time, the first of which is used in the computation of writing speed.

If the observed signature sequence is denoted by $$Z_i = (x_i + jy_i)\ i = 1, \ldots N\ (j = \sqrt{-1}\ )$$

measured at time points $t_i$, then the smoothed signature $S(t)$ minimizes the criterion $$\sum_{i=1}^{N} \|Z_i - S(t_i)\|^2 + \lambda \int \|S''(t)\|^2 dt.$$

If the second derivative $S''(t)$ is continuous, then the cubic spline provides the minimum of the above measure. The solution varies dramatically with the value of the smoothing parameter $\lambda$, which has to be supplied. It is desirable to use the cross-validated integrated Euclidean squared distance $$CV(\lambda) = \sum_{i=1}^{N} [Z_i - S^\lambda_{(i)}(t_i)]^2 \qquad (1)$$

as a criterion for selecting $\lambda$. Here $S^\lambda_{(i)}(t_i)$ is the value of the smooth curve evaluated at $t_i$; the subscript (i) indicates that the i-th point itself was omitted in the fitting of the curve. This criterion is desirable because it recognizes the signal in the signature, and selects a value for λ such that only enough smoothing is performed to eliminate the small amount of measurement error.

A time-dependent speed signal is calculated for each of the n smoothed sample signatures. It should be noted in this regard that appropriate speed signals are generated by the exemplary smoothing method.

Our parametric representation of the reference signatures involves global features and also involves stroke direction coding (SDC). Each global feature is a well-defined mathematical property of a sampled signature that represents the spatial and/or the dynamic characteristics of the signature as a whole.

By contrast, SDC is a method for capturing local information about the signature. Unlike conventional verification methods that compute local features from the shape of the signature per se, SDC extracts information about the stroke pattern which produced that shape. More specifically, SDC treats each signature as a time-ordered concatenation of a fixed number of strokes, and derives information about the spatial orientations of these stroke.

Global Features

The global features are evaluated on the smoothed reference signatures. In current embodiments of our invention, we are using 23 separate features. However, we believe the invention is usefully practiced with as few as three global features.

These global features are a useful complement to SDC, because they capture highly personal, dynamic aspects of the entrant's signature which would be difficult or impossible for a forger to emulate.

The global features we are currently using are listed in Appendix II. Each global feature is evaluated on each of the reference signatures.

For a given signature which is claimed to be of entrant i, an error $E_i$ is conveniently defined by $$E_i = \left[ \sum_{k=1}^{N_i} \left( (M_{ik} - \mu_{ik})/\sigma_{ik} \right)^2 \right]^{1/2}. \quad (2)$$

Here, $N_i$ is the total number of global features to be used for verifying the signatures of entrant i. $M_{ik}$ is the value of the k-th feature as evaluated on a signature claimed to be that of entrant i, and $\mu_{ik}$ and $\sigma_{ik}$ are, respectively, the mean and standard deviation of that feature over the reference set of entrant i.

It should be noted in this regard that the standard deviation $\sigma_{ik}$ is one measure of deviation over the reference set. In at least some cases, other deviation measures well known in the statistical arts may be used in place of the standard deviation. Similarly, the root mean-square error given by Equation 2 is one example of a norm into which the individual feature errors $M_{ik}-\mu_{ik}$ are combined. Other norms may also be useful in this regard, such as a sum of absolute values.

Significantly, when $N_i$ is smaller than the total number of global features that are available, distinct feature sets can be chosen which are personal to individual entrants. For example, the i-th feature set may consist of those $N_i$ features that exhibit the smallest standard deviation relative to their means, i.e., $\sigma_{ik}/\mu_{ik}$, over the reference set of entrant i.

When an unknown signature is to be verified, the corresponding error $E_i$ is advantageously compared to a cutoff threshold $\Theta_i$.

If $E_i$ is less than $\Theta_i$ (or alternatively, less than or equal to $\Theta_i$), the entrant signature is accepted. Otherwise, the signature is rejected.

According to a currently preferred procedure, during the initializing phase, the error $E_i$ is calculated for each of the reference signatures. The greatest of the errors calculated in that way (i.e., the reference errors) is the yardstick for establishing the cutoff threshold $\Theta_i$. That is, $\Theta_i$ is set to be equal to the greatest reference error, or it is set to some incrementally higher value, such as 10% above the greatest reference error. The cutoff threshold $\Theta$ can alternatively be set to achieve the trade-off between type I errors (false rejection) and type-II errors (false acceptance) desired for a particular application.

It should be noted in this regard that during this registration procedure, well-known statistical methods can be used for recognizing reference signatures having anomalous errors. Such anomalies might arise, for example, from non-reproducible errors in the entrant's penmanship. Such anomalous signatures are optionally eliminated from the reference set.

Figure 1:
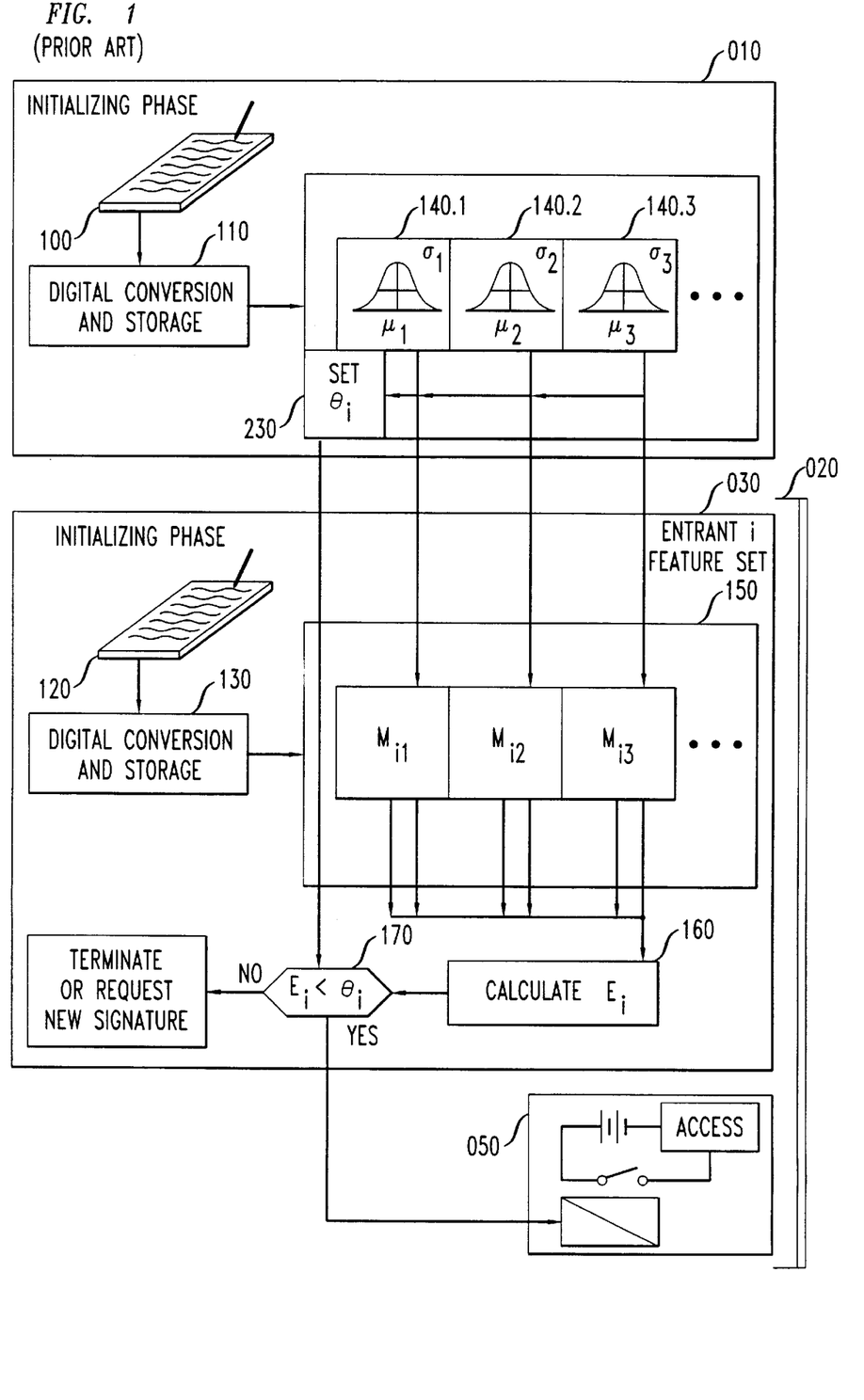
FIG. 1 is a flowchart of a prior art signature verification method using global features.

The foregoing discussion is summarized in FIG. 1. Device 100 is provided for inputting a reference set of signatures, during the registration procedure 010, to digital conversion and storage device 110, which exemplarily comprises a digital central processing unit. Analogous (and, for at least some applications, identical) inputting device 120 and conversion and storage device 130 are provided for the entry and storage of at least one entrant signature in the verification procedure 020. Data representing the reference set of signatures are processed to obtain the mean value and standard deviation over the reference set of each of a set of global features. For illustrative purposes, three such features, 140.1, 140.2, 140.3, are represented in the figure. The verification procedure includes a parameter-matching stage 030. In this parameter-matching stage, the stored, digitized entrant signature is subjected to digital processing 150, resulting, in the example of the figure, in computed values $M_{i1}$, $M_{i2}$, and $M_{i3}$, corresponding, respectively, to features 140.1–140.3. In processing step 160, an error is calculated from the reference parameter values and the $M_{ij}$ values as in Equation (2). In processing step 170, the error is compared to a threshold value (which may have been set, e.g., in block 230 of the initializing phase). If the error exceeds the threshold, the signature is rejected. At this point, a new submission of an entrant signature may be requested, or the transaction with the entrant may simply be terminated.

Figure 4:
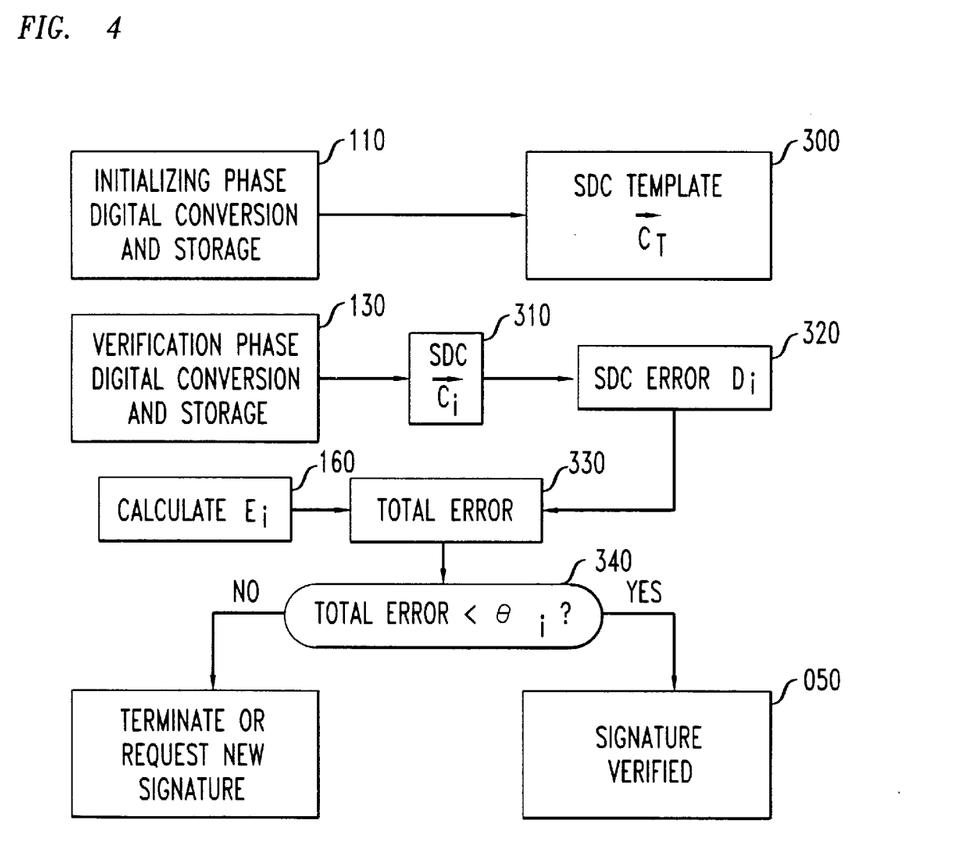
FIG. 4 is a flowchart illustrating the use of SDC information in combination with the method of FIG. 1, according to the invention in one embodiment.
Figure 5:
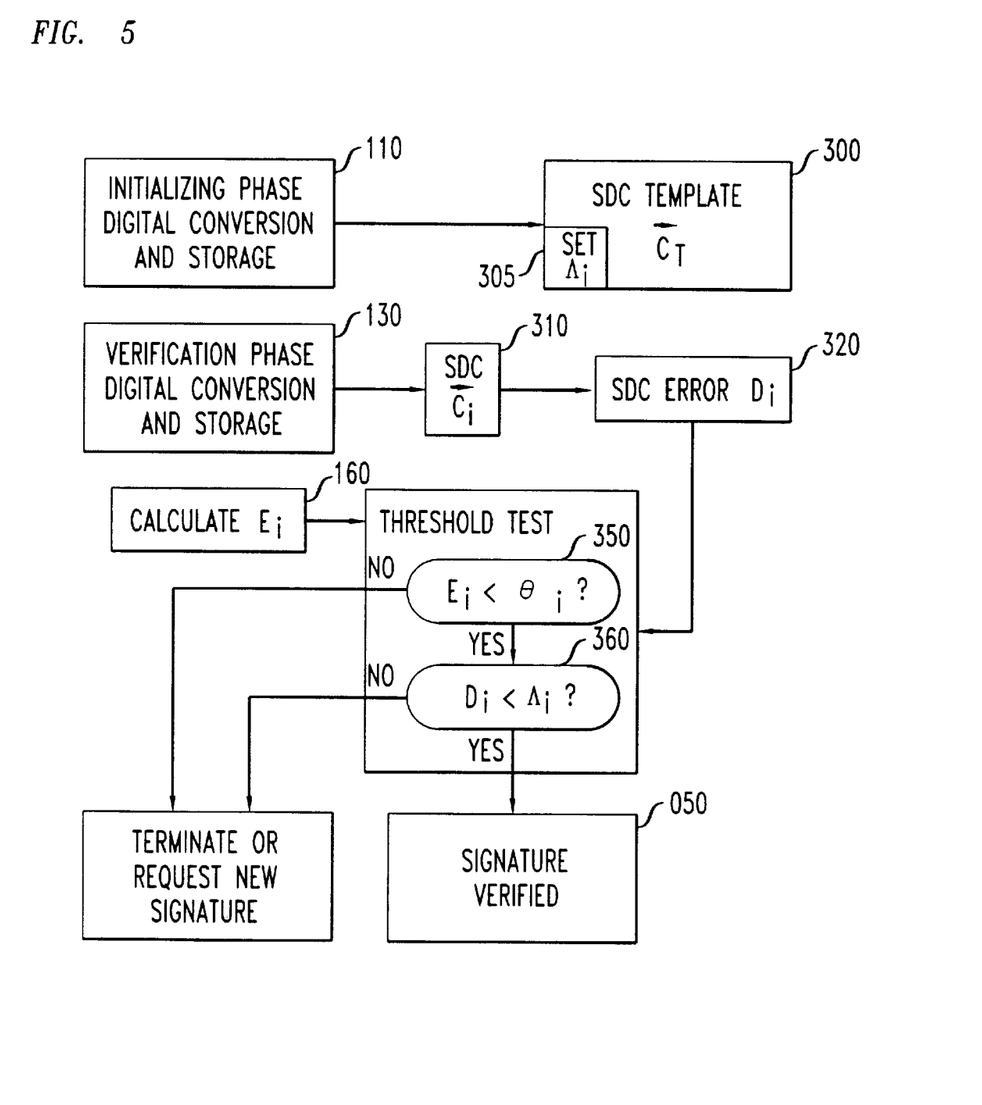
FIG. 5 is a flowchart illustrating the use of SDC information in combination with the method of FIG. 1, according to the invention in an alternate embodiment.

In typical practical applications of signature verification, acceptance of the signature will result in activation of electric circuit 050, making access to a system available to the entrant. (For purely illustrative purposes, such activation is depicted in the figure as activation of a relay.) In FIGS. 4 and 5, referred to below, the same reference numeral 050 will refer, more generally, to an action taken upon acceptance of the signature.

Significantly, in the verification procedure, the entrant signature is compared against a relatively small amount of data relating to the reference set. Such data consist of the identities of the selected features, the mean values (or other averages) and standard deviations (or other deviation measures) of those features over the reference set, and the threshold value. As part of the registration procedure, those data are conveniently digitally stored at a site which is local relative to the entrant. Such a site is, e.g., associated with a computer terminal or automatic teller machine through which the entrant conducts transactions with the access-controlled system. A particularly convenient location for such storage is a small, portable object such as a wallet card equipped with a digital data storage medium (e.g., magnetic storage or a solid state microchip memory device) and carried by the entrant. When the verification procedure is initiated, the data are readily entered into the access-controlled system from the local data storage medium.

Stroke-Direction Coding (SDC)

Our use of SDC takes place in two stages, which we now describe with reference to FIG. 4. The first stage is capturing stroke information, expressing this information in an SDC representation, and, as shown in box 300 of the figure, defining a template SDC vector which represents the signature SDC. The template vector of each registered entrant is readily stored as a parameter which augments the global feature set described above.

The second stage consists of deriving the SDC vector $\vec{C}_i$ of an unknown (trial) signature (as indicated in box 310 of the figure) and performing a correspondence matching of the trial SDC vector to the template SDC vector as a part of the verification procedure. When this matching step is applied to a signature (as indicated in box 320), the resultant deviation value $D_i$ is computed. We have found that when this error $D_i$ is combined with the global feature error $E_i$ (as indicated in box 330), discrimination between true signatures and forgeries is substantially improved.

According to our current practice, $E_i$ and $D_i$ are combined into a total error by summing their squares, and taking the square root of the result. Such a combination is an example of a norm of these two error values. Other norms may also be useful in this regard. Other combinations of errors that may similarly be useful include weighted sums and the harmonic mean. As shown in box 340 of the figure, the resulting total error is compared with threshold $\Theta_i$. (The value of this threshold is readily adjusted to take into account not only the error contribution due to the global features, but also the contribution due to SDC error.)

As shown in FIG. 5, an alternative way to use the SDC error $D_i$ is to compare it to a threshold $\Lambda_i$ distinct from the global feature threshold $\Theta_i$. As indicated in box 305 of the figure, such a threshold $\Lambda_i$ is readily derived from, e.g., a measure of the deviation of the SDC error over the set of reference signatures, obtained by taking each reference signature in turn as a trial signature.

In the verification procedure, the trial signature is then required to pass both the $\Theta_i$ threshold test (indicated in box 350) and the $\Lambda_i$ threshold test (indicated in box 360) to be accepted as genuine. (If only one test is satisfied, an intermediate action can be indicated, such as a demand for one or more additional trial signatures to be submitted.)

In the coding stage, the reference signatures are first normalized for size, position, and rotation. We currently prefer to use a Fourier normalization technique, which is described in Appendix I.

Each normalized signature is divided into a fixed number, k, of time-ordered links, each having respective endpoints $Z_n$, $Z_{n+1}$, where $Z_n$ is the complex number $x_n + jy_n$. The links are of approximately equal (spatial) length, except at pen-up points and at places where the signature has high curvature. A pen-up to pen-down sequence is treated as one link, regardless of its actual length. High-curvature portions of the signature are advantageously divided into strokes of shorter length in order to weight such portions more heavily in the subsequent correspondence-matching stage. (High-curvature portions are more useful for verification purposes than are pen-up segments, which tend to exhibit relatively low consistency even when made by the same individual.)

Figure 2:
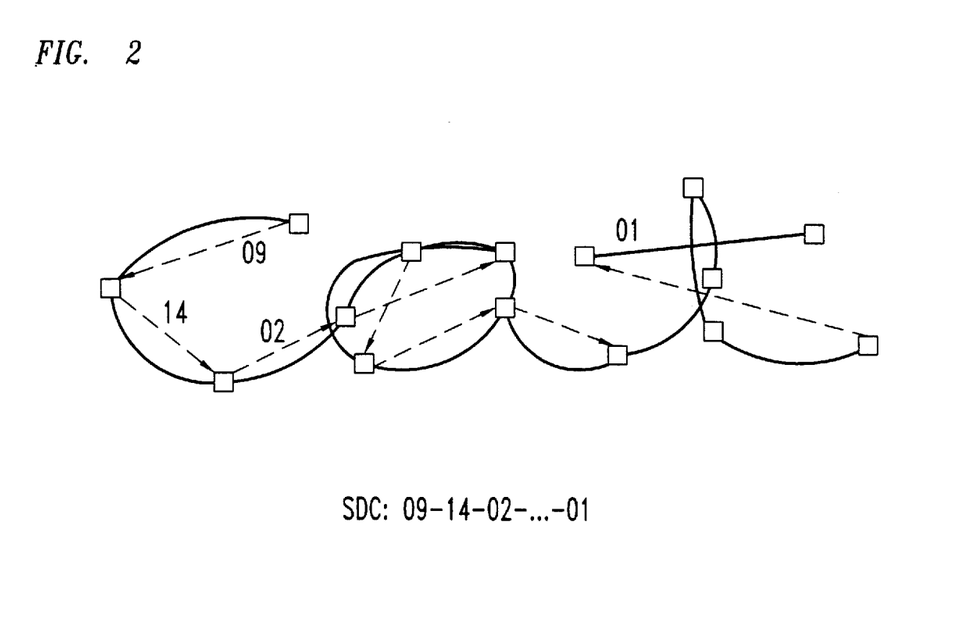
FIG. 2 is an example of the derivation of a stroke-direction code (SDC) representation of a handwritten word.

The division of a handwritten word into links is illustrated in FIG. 2.

The stroke direction of each link is assigned the closest of a fixed number of quantized values from 0 to m. the SDC representation of a given signature is thus a vector $\vec{C} = (C_0, C_1, \ldots, C_k)$, wherein each element $C_n$ is given by $$C_n = \left\lfloor \frac{(m+1) arg(Z_{n+1} - Z_n)}{2\pi} \right\rfloor ; n = 0, 1, \ldots, k \quad (3)$$

Here, arg(Z) is the argument of complex number Z in radians, and the brackets indicate that the nearest integer value is to be taken, modulo (m+1).

Figure 3:
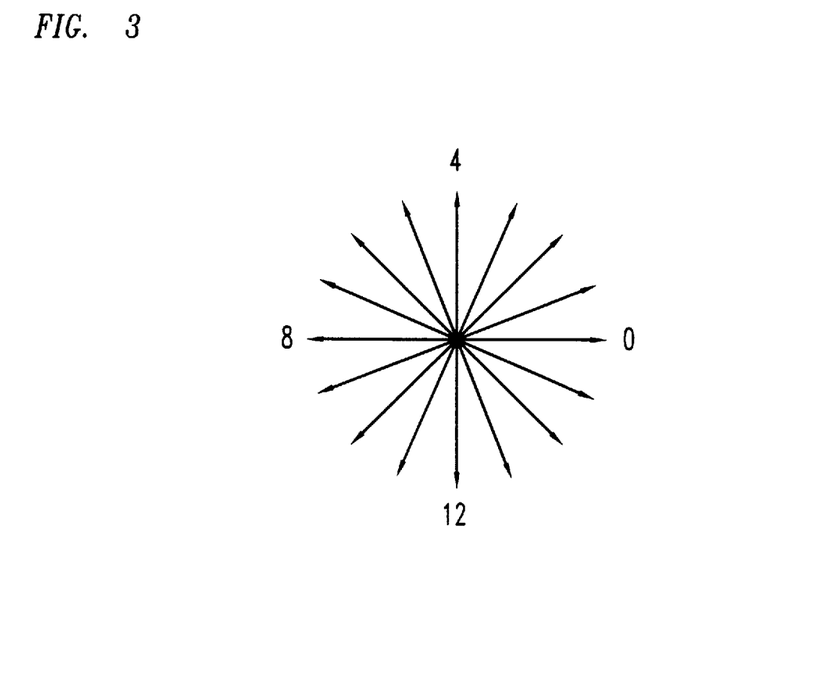
FIG. 3 is an illustrative set of discrete stroke directions for deriving an SDC such as the SDC of FIG. 2. This set of directions corresponds to a division of the circle into 16 equal sectors of 22.5°.

A stroke-direction code of m+1=16 directions is illustrated in FIG. 3.

The SDC template vector (also referred to as, simply, the template) is an average or representative signature, in SDC representation, over the set of reference signatures. According to our current practice for deriving a template, we designate as a model signature that one of the reference signatures that lies nearest the centroid (see below) of an SDC representation of the reference set. The template $C_T(t)$ is the SDC representation of the model signature. The independent variable t is the index that identifies the time-ordered links of the template.

Because of natural inconsistencies during signing, a given pair of signatures by the same person will not, in general, exhibit a one-to-one linear alignment. Instead, length differences along the respective signatures will lead to misalignment of their respective links. The mapping which minimizes the distance between $\vec{C}_T$ and $\vec{C}_K$ (the test signature) is the optimal alignment between the respective signatures, and this minimal distance is taken as the SDC error $D_i$:

$$D_i = min_\tau \|C_T(t) - C_K(\tau(t))\|. \quad (4)$$

The SDC error $D_i$ is evaluated according to the techniques of dynamic programming (DP). In the application of DP techniques, a family of mappings $\tau(t)$ are provided from the links of the template SDC to links of the test signature's SDC. At various points, any of these mappings may be many-to-one as well as one-to-many. However, all of these mappings (which are often referred to as "warping functions") must be continuous and monotonic. These techniques are described, for example, in H. Sakoe, et al., "Dynamic Programming Algorithm Optimization for Spoken Word Recognition," IEEE Trans. Acoust., Speech, Signal Processing, vol., ASSP-26 (1978), pp. 43–49.

As noted, the template that we are currently using corresponds to the model signature, i.e., that reference signature that lies closest to the centroid of the reference set in SDC representation. The model signature is readily identified by finding the SDC error between each pair of reference signatures. The model signature is that reference signature that has the smallest total error relative to all of the other reference signatures.

EXAMPLE

We tested our signature verification method, using 23 global features plus SDC, on a database of 542 genuine signatures and 325 forgeries. Each reference set consisted of the first 6 signatures of one of the 59 subjects.

Figure 6:
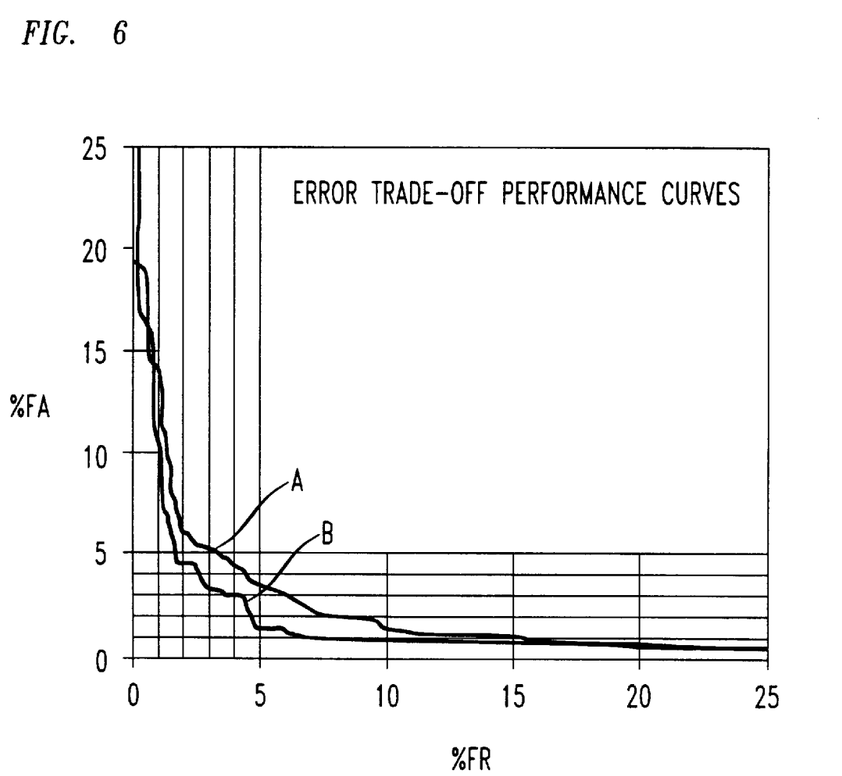
FIG. 6 is a pair of error trade-off curves that demonstrate the advantage of adding SDC information to a signature verification process using global features. Curve A represents a process using global features only. Curve B represents a process using both global features and SDC information.

FIG. 6 is an error trade-off plot for verification with global features only (Curve A), and for verification with global features plus SDC (Curve B). In each case, the rate of false acceptance (FA or Type 2) errors is plotted against the rate of false rejection (FR or Type 1) errors.

It is evident from FIG. 6 that SDC improves performance in all regions of the plot. When SDC is added, the equal-error rate decreases from about 4.5% to about 3%. Even more remarkably, at a 1% FR rate, the FA rate drops from about 13% to about 7.5%.

We found that about 150 bytes of storage suffices to hold the global feature and SDC information defining the signature model.

Appendix I

Fourier Normalization

A signature is conveniently represented as a sequence of complex numbers $Z_i = x_i + jy_i$. The general affine transformation of a signature (or other planar curve) is expressed by $$Z'_i = AZ_i + B, \qquad (5)$$

wherein $A = Ke^{j\Theta}$, $K>0$ is a scale factor, $e^{j\Theta}$ represents a rotation of the signature by angle $\theta$, and B represents a translation of the signature.

A Fourier transform of the signature can be defined by $$Z_k = \frac{1}{n} \sum_{i=0}^{N-1} Z_i e^{-2\pi jik/N}. \qquad (6)$$

The resulting sequence of Fourier descriptors (FD) can be understood as a representation of the signature in the spatial-frequency domain.

Signature Normalization:

The objective of signature normalization is to transform all the signatures to some canonical form which are then processed by the signature verification algorithm. Our approach to signature normalization is based on the normalization of its FD. First we set $Z_0 = 0$ which, according to equation 5, is equivalent to translating the coordinate system origin to the curve centroid $$Z_0 = \frac{1}{n} \sum_{k=0}^{N-1} z_k. \qquad (7)$$

Figure 7A:
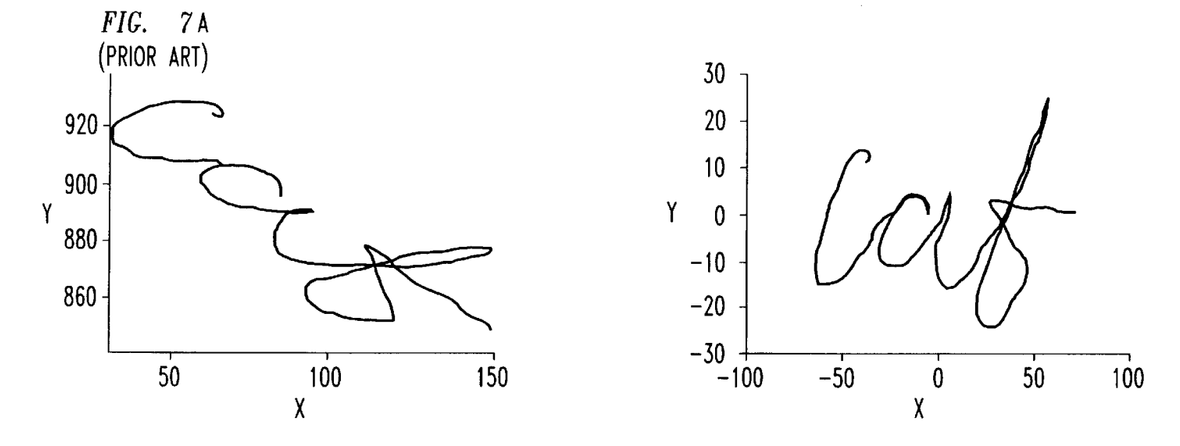
FIGS. 7A and 7B illustrate the normalization of handwritten words. In each figure, a word as acquired from an instrumented tablet is shown on the left. On the right is the same word after normalization.
Figure 7B:
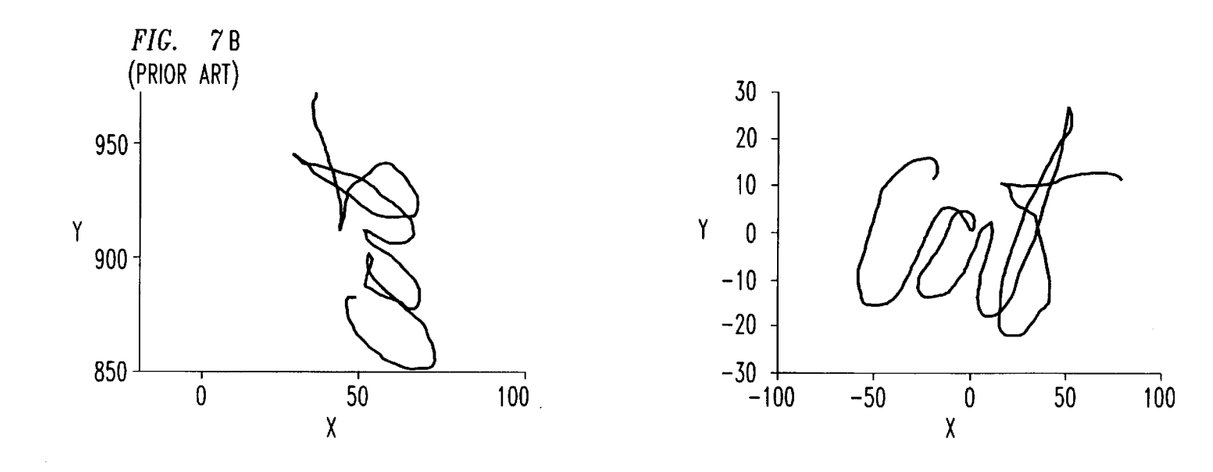

Next, we divide the rest of the FD by $Z_1$. Since the Fourier transform is linear, each coordinate of the translated signature is divided by $Z_1$ which, according to equation 5, is equivalent to scaling by $K=1/|Z_1|$ and rotating by $\theta = \arg Z_1$. Normalization for size, position and orientation using this method is shown in FIGS. 7A and 7B. In each of these figures, the left side shows a handwriting sample before the normalization; the normalized sample is shown on the right.

Appendix II

Table of Signature Features

| NUMBER | FEATURE NAME | METHOD OF ESTIMATION |
|---|---|---|
| 1 | Total signature time | $T = t_K - t_1$ |
| 2 | Pen-down time ratio | $T_{dr} = T_d/T$ |
| 3 | Rms speed | $V = \left( \frac{1}{K} \sum_{k=1}^{K} v(k)^2 \right)^{1/2}$ |
| 4 | Average horizontal speed | $V_x = \frac{1}{K} \sum_{k=1}^{K} v_x(k)$ |
| 5 | Integrated abs. centripetal accel. | $IA_c = \sum_{k=1}^{K} |v(k)\dot\theta(k)|$ |
| 6 | Length-to-width ratio | $L_w = V_m T_d/X_w$ |
| 7 | Horizontal span ratio | $X_{wr} = X_w/H$ |
| 8 | Horizontal centroid | $X_{cn} = X_m - \min(x)$ |
| 9 | Vertical centroid | $Y_{cn} = Y_m - \min(y)$ |
| 10–17 | Direction histogram | $S_1 = \text{card } \{\theta_k:(1-1)\pi/4 < \theta_k \leq 1\pi/4\}/K$, $k = 1, \ldots, K$, $1 = 1, \ldots, 8$ |
| 18–21 | Direction change histogram | $C_m = \text{card } \{\delta_k:(m-1)\pi/2 \leq \delta_k \leq m\pi/2\}/(K-1)$, $k = 2, \ldots, K$, $m = 1, \ldots, 4$ |
| 22 | X,Y speed correlation | $V_{xy} = \left| \sum_{k=1}^{K} v_x(k)v_y(k) \right|$ |
| 23 | First moment | $M1 = (x_m^2 + y_m^2)/N$, $N$ = number of samples, $x_m = \sum_1^N (x - X_m)$, $y_m = \sum_1^N (y - Y_m)$, $X_m, Y_m$ are the means of x and y respectively |

The invention claimed is:

1. A method for encoding the handwritten signature of a person, comprising:

(a) digitally sampling the trajectory of a stylus thereby to provide a digitized signature record;

(b) storing said record in a digital memory;

(c) digitally processing said record, thereby to derive a numerical value for each of a plurality of global features of the signature;

(d) storing said numerical values in a digital memory;

(e) subdividing the signature into a time-ordered sequence of oriented links;

(f) assigning to each link a quantized stroke-direction value corresponding to the respective orientation of that link, thereby to obtain for the signature as a whole an ordered sequence of stroke-direction values, said sequence to be referred to as a stroke-direction code (SDC);

(g) storing the SDC in a digital memory;

(h) repeating steps (a)–(g) for each of a plurality of signatures provided by the same person, thereby to provide, in a digital memory: (i) a reference set of feature vectors, each of said feature vectors consisting of the numerical global-feature values relating to a respective one of the signatures; and (ii) a reference set of SDCs, each said SDC relating to a respective one of the signatures;

(i) averaging the feature vectors, thereby to derive an average and a deviation measure of each of the respective global features over the feature-vector reference set;

(j) storing the averages and the deviation measures in a digital memory;

(k) evaluating a distance function, to be referred to as the SDC distance, between each pair of SDCs in the SDC reference set;

(l) identifying as an average or representative SDC, to be referred to as the SDC template, that one SDC that has the least mean-square distance to all of the other SDCs in the SDC reference set; and (m) storing the SDC template in a digital memory.

2. The method of claim 1, wherein the distance-function-evaluating step is performed by dynamic programming.

3. A method for encoding the handwritten signature of a person, comprising:

(a) digitally sampling the trajectory of a stylus thereby to provide a digitized signature record;

(b) storing said record in a digital memory;

(c) digitally processing said record, thereby to derive a numerical value for each of a plurality of global features of the signature; and (d) storing said numerical values in a digital memory;

CHARACTERIZED IN THAT the digital processing step further comprises:

(e) taking a Fourier transform of the signature, thereby to derive a sequence of Fourier descriptors;

(f) normalizing the Fourier descriptors for size, position, and orientation;

(g) after (f), subdividing the signature into a time-ordered sequence of oriented links;

(h) assigning to each link a quantized stroke-direction value corresponding to the respective orientation of that link, thereby to obtain for the signature as a whole an ordered sequence of stroke-direction values, said sequence to be referred to as a stroke-direction code (SDC); and (i) storing the SDC in a digital memory.

4. A method for verifying the handwritten trial signature of a person, comprising:

(a) digitally sampling the trajectory of a stylus, thereby to provide a digitized signature record;

(b) storing said record in a digital memory;

(c) digitally processing said record, thereby to derive a numerical value for each of a plurality of global features of the signature; and (d) in a digital data-processing unit, comparing said numerical global-feature values to global-feature reference data retrieved from a digital memory;

CHARACTERIZED IN THAT the method further comprises:

(e) taking a Fourier transform of the signature, thereby to derive a sequence of Fourier descriptors;

(f) normalizing the Fourier descriptors for size, position, and orientation;

(g) after (f), subdividing the signature into a time-ordered sequence of oriented links;

(h) assigning to each link a quantized stroke-direction value corresponding to the respective orientation of that link, thereby to obtain for the trial signature as a whole an ordered sequence of stroke-direction values, said sequence to be referred to as a trial stroke-direction code (SDC); and (i) comparing said trial SDC to SDC reference data retrieved from a digital memory.

5. A method for verifying the handwritten trial signature of a person, comprising:

(a) digitally sampling the trajectory of a stylus, thereby to provide a digitized signature record;

(b) storing said record in a digital memory;

(c) digitally processing said record, thereby to derive a numerical value for each of a plurality of global features of the signature;

(d) in a digital data-processing unit, comparing said numerical global-feature values to global-feature reference data retrieved from a digital memory;

(e) subdividing the signature into a time-ordered sequence of oriented links;

(f) assigning to each link a quantized stroke-direction value corresponding to the respective orientation of that link, thereby to obtain for the trial signature as a whole an ordered sequence of stroke-direction values, said sequence to be referred to as a trial stroke-direction code (SDC); and (g) comparing said trial SDC to SDC reference data retrieved from a digital memory; wherein:

the global-feature reference data comprise the mean value and standard deviation of each of the respective global features taken over a plurality of reference signatures provided by the person during a registration procedure;

step (d) comprises: determining a difference between each numerical global-feature value and the corresponding one of said mean values; and combining said differences, thereby to obtain a global-feature error value;

the SDC reference data comprise an average or representative SDC taken over said plurality of reference signatures, to be referred to as an SDC template; and step (g) comprises: by dynamic programming, determining a distance, to be referred to as the SDC error value, between the trial SDC and the SDC template.

6. The method of claim 5, further comprising:

combining the global-feature error value with the SDC error value, thereby to obtain a total error;

comparing the total error to a threshold; and if the total error is smaller than the threshold, activating an electric circuit, thereby to indicate that the trial signature is verified.

7. The method of claim 6, wherein:

each difference between a numerical global-feature value and the corresponding mean value is normalized to the corresponding standard deviation before combining said differences.

8. The method of claim 5, further comprising:

comparing the global-feature error value with a first threshold;

comparing the SDC error value with a second threshold; and if the global-feature error value is less than the first threshold, and also the SDC error value is less than the second threshold, activating an electric circuit, thereby to indicate that the trial signature is verified.

9. Apparatus comprising:

a digital memory for receiving and storing digitized human signatures from a signature digitizing device;

a global feature extractor in receiving relationship to said memory, for: (i) deriving, from each digitized signature received from said memory, numerical values of at least two global features of said digitized signature, and (ii) storing said values in a data storage device as a global feature vector;

a stroke-direction coder, in receiving relationship to said memory, for: (i) deriving, from each digitized signature received from said memory, an ordered sequence of numerical stroke-direction values, to be referred to as an SDC vector, and (ii) storing said values in a data storage device;

an averager for: (i) receiving plural global feature vectors and deriving from said vectors an average global feature vector, and (ii) storing said average global feature vector in a data storage device;

a processing element for: (i) receiving plural SDC vectors and deriving from said vectors an average or representative SDC vector, and (ii) storing said average or representative SDC vector in a data storage device; and a correlating element for deriving, by dynamic programming methods, a distance between each pair of said plural SDC vectors.

10. Apparatus of claim 9, wherein said processing element further comprises:

a selection element for identifying, from said distances, that SDC vector that lies nearest a centroid of said plural SDC vectors.

11. Apparatus comprising:

a digital memory for receiving and storing digitized human signatures from a signature digitizing device;

a global feature extractor in receiving relationship to said memory, for: (i) deriving, from each digitized signature received from said memory, numerical values of at least two global features of said digitized signature, and (ii) storing said values in a data storage device as a global feature vector;

a stroke-direction coder, in receiving relationship to said memory, for: (i) deriving, from each digitized signature received from said memory, an ordered sequence of numerical stroke-direction values, to be referred to as an SDC vector, and (ii) storing said values in a data storage device;

a first error element for: (i) comparing the global feature vector of a designated signature to a stored global feature reference vector, and (ii) deriving a first error measure of discrepancy between said compared feature vectors;

a second error element for: (i) comparing the SDC vector of a designated signature to a stored average or representative SDC vector, and (ii) applying dynamic programming methods to derive a second error measure of distance between said compared SDC vectors; and a threshold element for: (i) applying a threshold condition to said first and second error measures, and (ii) if said threshold condition is satisfied, activating an electric circuit, thereby to indicate that the designated signature has been verified.

* * * * *